United States Patent
Yamaguchi et al.

(10) Patent No.: US 9,106,116 B2
(45) Date of Patent: Aug. 11, 2015

(54) ROTOR OF ROTATING ELECTRICAL MACHINE

(71) Applicant: AISIN AW CO., LTD.

(72) Inventors: Yasuo Yamaguchi, Kariya (JP); Hiroaki Sanji, Takahama (JP)

(73) Assignee: AISIN AW CO., LTD., Anjo (JP)

( * ) Notice: Subject to any disclaimer, the term of this patent is extended or adjusted under 35 U.S.C. 154(b) by 436 days.

(21) Appl. No.: 13/670,928

(22) Filed: Nov. 7, 2012

(65) Prior Publication Data

US 2013/0162099 A1 Jun. 27, 2013

(30) Foreign Application Priority Data

Dec. 27, 2011 (JP) ................... 2011-286808

(51) Int. Cl.
*H02K 1/28* (2006.01)
*H02K 1/27* (2006.01)

(52) U.S. Cl.
CPC . *H02K 1/278* (2013.01); *H02K 1/28* (2013.01)

(58) Field of Classification Search
CPC ............. H02K 1/22; H02K 1/27; H02K 1/28; H02K 1/2706; H02K 1/272; H02K 1/274
USPC ......... 310/216.009, 216.008, 156.12, 156.26, 310/216.41, 402, 406, 410, 413, 417
See application file for complete search history.

(56) References Cited

U.S. PATENT DOCUMENTS

2006/0279160 A1* 12/2006 Yoshinaga et al. ............ 310/216
2007/0046125 A1* 3/2007 Torii et al. ................ 310/156.53
2008/0093135 A1* 4/2008 Nomura et al. .............. 180/65.2
2010/0060099 A1* 3/2010 Sugiyama .............. 310/216.008
2010/0283351 A1* 11/2010 Tsumagari ............. 310/216.043
2011/0175486 A1* 7/2011 Sugiyama et al. ..... 310/216.041

FOREIGN PATENT DOCUMENTS

| JP | U-56-156346 | 11/1981 |
| JP | U-63-146441 | 9/1988 |
| JP | A-2002-262496 | 9/2002 |
| JP | A-2007-20386 | 1/2007 |
| JP | A-2011-151877 | 8/2011 |

OTHER PUBLICATIONS

Feb. 12, 2013 International Search Report issued in International Patent Application No. PCT/JP2012/079208; with partial English-language translation.

* cited by examiner

*Primary Examiner* — Michael Andrews
(74) *Attorney, Agent, or Firm* — Oliff PLC

(57) ABSTRACT

A rotor of a rotating electrical machine includes a rotor core which includes an annular core plate formed by coupling a plurality of arc shaped core plate pieces. Multiple core plates are stacked together. A circumferential position of a seam formed by coupling the core plate pieces is alternately displaced for every predetermined number of core plates in a stacking direction of the core plates. A bar-shaped member is inserted in a plurality of through holes formed in the respective core plate pieces and aligned in the stacking direction. Both side surfaces of the rotor core in the stacking direction are interposed between end plates, the end plates contact the core plates, and the end plates do not contact the bar-shaped member at least on a radially outside of the bar-shaped member, which is a side in a direction of a centrifugal force that acts on the bar-shaped member.

18 Claims, 11 Drawing Sheets

ROTOR OF ROTATING ELECTRICAL MACHINE

The disclosure of Japanese Patent Application No. 2011-286808 filed on Dec. 27, 2011 including the specification, drawings and abstract is incorporated herein by reference in its entirety.

BACKGROUND OF THE INVENTION

The present invention relates to a rotor of a rotating electrical machine including a rotor core formed by stacking core plates, and more particularly to a holding structure of the rotor core.

DESCRIPTION OF THE RELATED ART

Rotors of rotating electrical machines are typically known in the art in which a rotor core is formed by stacking annular core plates punched out from an electromagnetic steel plate and is fixed to a rotor hub. Conventionally, in order to improve material yield, it is proposed to form a rotor core by dividing each annular core plate into pieces in the circumferential direction, coupling the divided core plate pieces together in the circumferential direction, and stacking the resultant annular core plates in the axial direction (see Japanese Patent Application Publication No. 2002-262496 (JP 2002-262496 A) and Japanese Patent Application Publication No. 2011-151877 (JP 2011-151877 A)).

SUMMARY OF THE INVENTION

Figure 10:
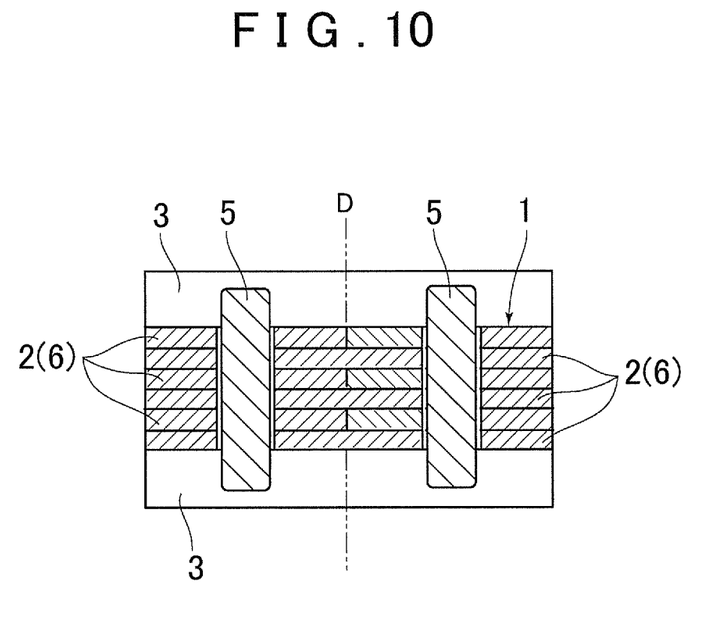
FIG. 10 is a schematic view showing a circumferential section of a conventional rotor.

In the rotor cores described in JP 2002-262496 A and JP 2011-151877 A, the annular core plates are divided into pieces. Thus, each of the divided core plate pieces is subjected to a centrifugal force during rotation of the rotor core, which reduces rotation strength. Accordingly, the strength during rotation is improved as follows. As shown in FIG. 10, a rotor core 1 is formed by stacking core plates 2 in a bricklaying pattern, namely in such a manner that the positions of seams D between core plate pieces 6 adjoining in the circumferential direction are alternately displaced for every layer of the stacked core plates 2. Moreover, a plurality of pins 5, which extend through the rotor core 1 in the stacking direction, are fixed by, e.g., clinching, to end plates 3, 3 that have the rotor core 1 interposed therebetween and are fixed to a rotor hub (not shown).

Figure 11:
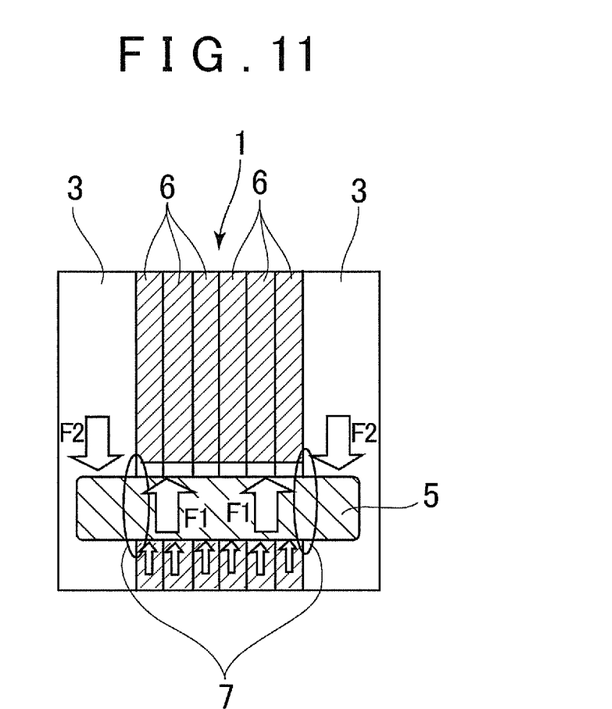
FIG. 11 is a schematic view of a radial section of the conventional rotor.

However, as shown in FIG. 11, when the rotor core 1 is rotated, each core plate piece 6 is subjected to a centrifugal force and tries to move in the direction of the centrifugal force (the direction F1), but the pin 5 is fixed by the end plates 3, 3 and does not move. Accordingly, the pin 5 abuts on each core plate piece 6, and is subjected to a load F1. The pin 5 is pressed by the end plates 3, 3 in the direction opposite to that of the load F1, and thus is also subjected to a reaction force F2. As a result, the pin 5 is subjected to a large shear force at positions 7 on the mating faces between the rotor core 1 and the end plates 3, 3. In order to ensure the strength that is high enough to resist the sear force, it is necessary to increase the diameter of the pin 5. However, increasing the diameter of the pin 5 increases a required radial dimension of the core plate piece 6, which increases material cost and causes an increase in overall cost. Moreover, increasing the diameter of the pin 5 reduces the inner diameter of the rotor core 1, and thus reduces an available space inside the rotor core 1.

It is an object of the present invention to provide a rotor of a rotating electrical machine that reduces a load that is applied to a pin (a bar-shaped member) extending through a core plate piece and thus solves the above problems.

According to an aspect of the present invention, a rotor of a rotating electrical machine includes: a rotor core in which the rotor core includes an annular core plate formed by coupling a plurality of arc-shaped core plate pieces, a plurality of the core plate is stacked together, a circumferential position of a seam formed by coupling the core plate pieces is alternately displaced for every predetermined number of core plates in a stacking direction of the core plates, a bar-shaped member is inserted in a plurality of through holes formed in the respective core plate pieces and aligned in the stacking direction, and both side surfaces of the rotor core in the stacking direction are interposed between end plates, the end plates contacts the core plates, and the end plates do not contact the bar-shaped member at least on a radially outside of the bar-shaped member, which is a side in a direction of a centrifugal force that acts on the bar-shaped member.

Thus, the bar-shaped member trying to move toward the radially outside of the bar-shaped member is not pressed by the end plates, and no load is applied from the end plates to the bar-shaped member. This reduces strength required for the bar-shaped member, and allows the bar-shaped member to be formed with a small diameter, whereby material cost of the bar-shaped member can be reduced. Moreover, radial dimensions of the through holes and the core plate pieces can be reduced, whereby material cost of an electromagnetic steel plate, etc. can be reduced, and the overall size and weight of the rotor can be reduced. Moreover, since the required radial dimension of the core plate pieces is reduced, the space inside the rotor is increased, which makes it easier to place a structure such as a gear inside the rotor.

As used herein, the term contact means the state in which the bar-shaped member is subjected to a load.

Figure 5:
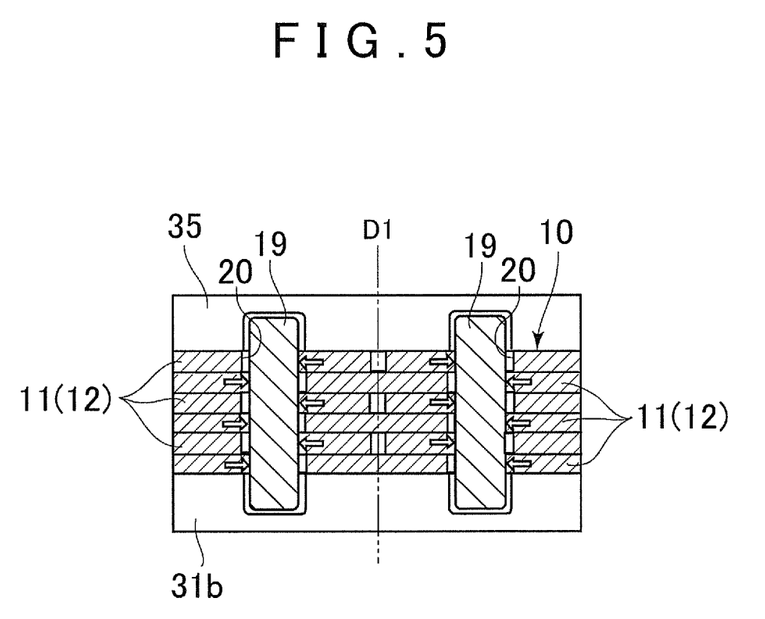
FIG. 5 is a cross-sectional view taken along line B-B in FIG. 4.

Referring to, e.g., FIG. 5, the bar-shaped member contacts the through holes in the respective core plate pieces during rotation of the rotor such that movement of the bar-shaped member toward the radially outside of the bar-shaped member is restricted.

Thus, the bar-shaped member is held only by the rotor core, and does not contact other members, whereby the load that is applied to the bar-shaped member can be reduced, and the bar-shaped member can be formed with a smaller diameter.

Figures 2A, 2B:
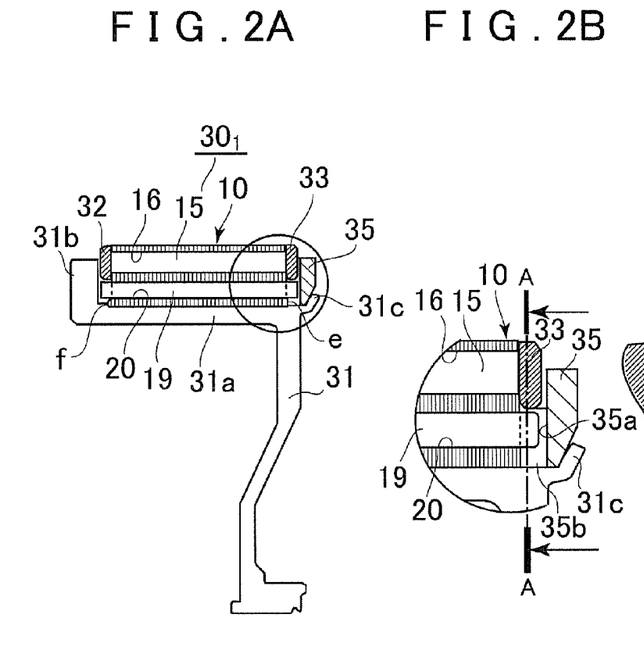
FIG. 2A is a partial view.
FIG. 2B is a partial enlarged view.
Figure 2C:
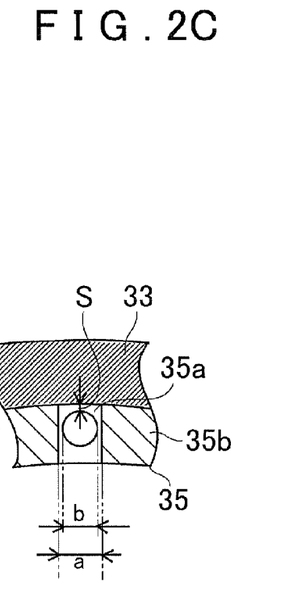
FIG. 2C is a cross-sectional view taken along line A-A in FIG. 2B.

Referring to, e.g., FIG. 2, the end plates are formed such that a space portion is formed on the radially outside of the bar-shaped member.

This allows a configuration to be implemented in which the end plates do not contact the bar-shaped member at least on the radially outside of the bar-shaped member.

Figure 6:
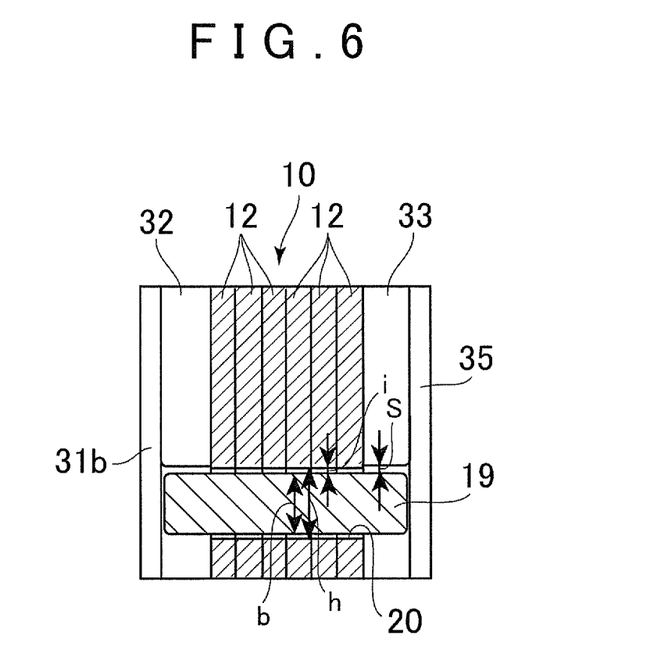
FIG. 6 is a cross-sectional view taken along line C-C in FIG. 4.

Referring to, e.g., FIG. 6, a diameter dimension of the bar-shaped member is smaller than a diameter dimension of the through holes, and the bar-shaped member is loose-fitted in the through holes.

Thus, since no load is applied from the through holes of the respective core plate pieces to the bar-shaped member as in the case where the bar-shaped member is press-fitted in the through holes, the bar-shaped member can be formed with a smaller diameter.

Referring to, e.g., FIG. 6, a predetermined gap, which is larger than a gap of the loose-fit, is formed on the radially outside of the bar-shaped member between the bar-shaped member and the end plates.

Thus, since the bar-shaped member can move in the radially outward direction toward the end plates by an amount larger than the gap of the loose-fit, no load is applied from the end plates to the radially outside of the bar-shaped member. Accordingly, the bar-shaped member can be formed with a smaller diameter.

Referring to, e.g., FIGS. 2, 7, 8, and 9, the rotor core is mounted on a rotor hub that is fixed to a rotating shaft and that rotates together therewith, and the rotor core and the end plate are fixed by a retaining portion provided in the rotor hub, with a retaining plate interposed therebetween.

Thus, the rotor core, the end plates, the retaining plate, and the rotor hub can be held in a unified state, whereby torque of the rotor core can be transferred to the rotating shaft via the rotor hub.

Referring to, e.g., FIG. 2, the retaining plate has a recessed groove on one side in the stacking direction such that a circumferential dimension of the recessed groove is larger than a diameter dimension of the bar-shaped member, and the bar-shaped member overlaps the end plates in the stacking direction and extends into the recessed groove, and is placed such that a predetermined gap is formed at least on the radially outside of the bar-shaped member between the bar-shaped member and the end plates and the recessed groove.

Thus, the bar-shaped member can be held so as not to contact the end plates, and can be reliably retained in place by the retaining plate.

Figures 7A, 7B:
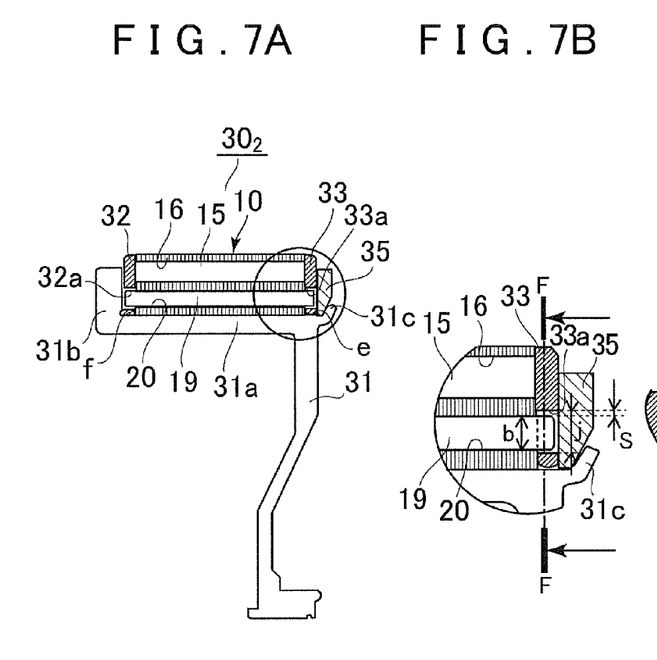
FIG. 7A is a partial view.
FIG. 7B is a partial enlarged view.
Figure 7C:
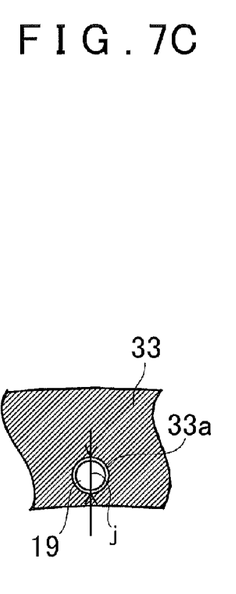
FIG. 7C is a cross-sectional view taken along line F-F in FIG. 7B.

Referring to, e.g., FIG. 7, a hole having a larger diameter dimension than the bar-shaped member is provided in the end plates, and the bar-shaped member extends into the hole such that a predetermined gap is formed at least on the radially outside of the bar-shaped member between the hole and the bar-shaped member.

Thus, the structures of the end plates and the retaining plate can be simplified.

Figures 8A, 8B:
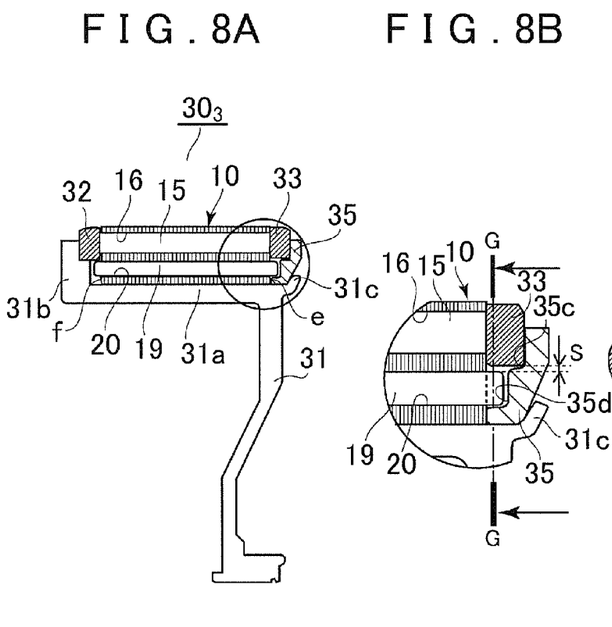
FIG. 8A is a partial view.
FIG. 8B is a partial enlarged view.
Figure 8C:
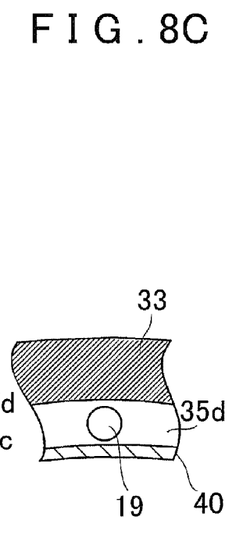
FIG. 8C is a cross-sectional view taken along line G-G in FIG. 8B.

Referring to, e.g., FIG. 8, the retaining plate has a first stepped portion abutting on the end plate, and a second stepped portion protruding beyond the first stepped portion toward the rotor core and receiving the bar-shaped member, and the bar-shaped member is placed such that a predetermined gap is formed at least on the radially outside of the bar-shaped member between the bar-shaped member and the second stepped portion and the end plates, and that the bar-shaped member overlaps the end plates in the stacking direction.

Thus, the bar-shaped member can be reliably retained and held in place.

In the above description, the reference characters are shown in the parentheses for reference to the drawings, and are not intended in any way to limit the configuration of the present invention.

BRIEF DESCRIPTION OF THE DRAWINGS

FIGS. 2A to 2C are schematic views showing a rotor according to the first embodiment of the present invention, where

FIGS. 7A to 7C are schematic views showing a rotor according to a second embodiment of the present invention, where

FIGS. 8A to 8C are schematic views showing a rotor according to a third embodiment of the present invention, where

FIGS. 9A and 9B are schematic views showing a rotor according to a fourth embodiment of the present invention, where

DETAILED DESCRIPTION OF THE EMBODIMENTS

A first embodiment of the present invention will be described below with reference to the accompanying drawings. In the following description, radially outside refers to the side in the direction of a centrifugal force that acts on a pin extending through a rotor core, and the stacking direction refers to the direction in which core plates are stacked and refers to the same direction as the axial direction of a rotating shaft when the rotor core is attached to a rotor hub.

Figure 1:
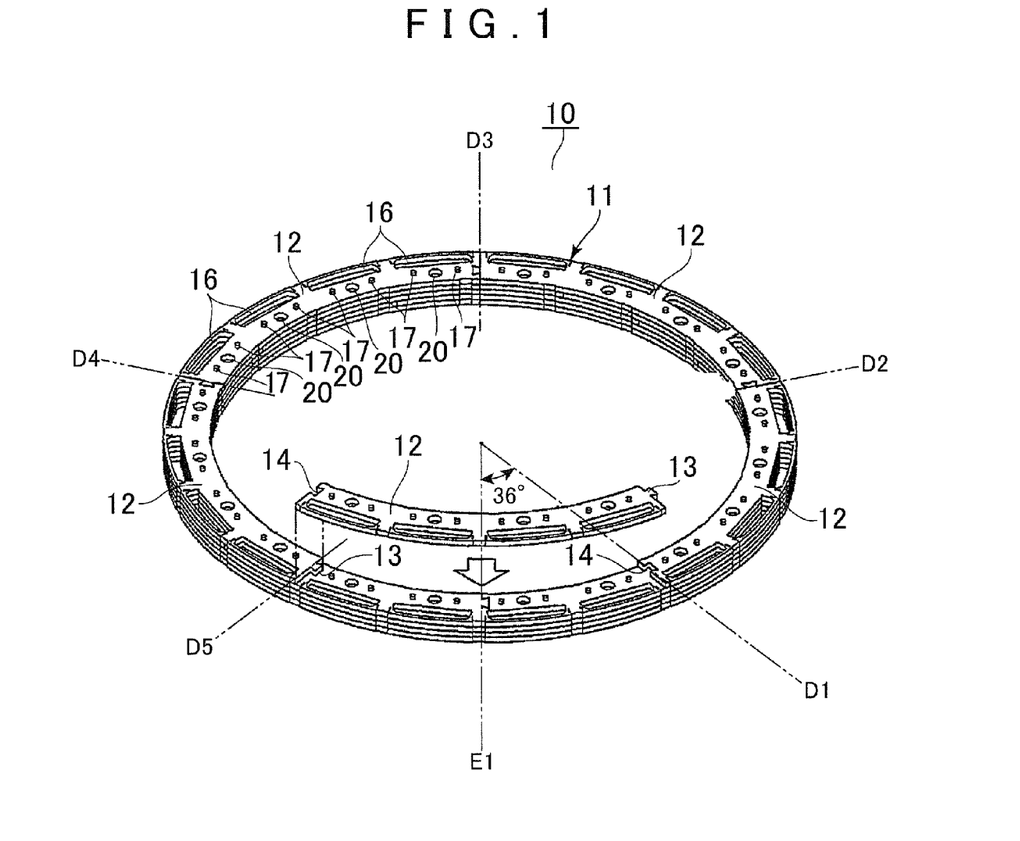
FIG. 1 is a schematic view showing a bricklaying pattern of a rotor core according to a first embodiment of the present invention.

As shown in FIG. 1, a rotor core 10 for an interior permanent magnet (IPM) synchronous motor (a rotating electrical machine) has a cylindrical shape formed by stacking a plurality of annular core plates 11. In order to improve material yield, each core plate 11 is formed by a plurality of (in the present embodiment, five) core plate pieces 12 equally divided in the circumferential direction. Each core plate piece 12 is formed by an arc-shaped thin plate. Each core plate piece 12 has a protruding portion 13 formed at its one end in the circumferential direction so as to be coupled to adjoining one of the core plate pieces 12, and has a fitting portion 14 formed at the other end so that the protruding portion 13 of another adjoining core plate piece 12 is fitted therein. In each core plate 11, the number of seams D1, D2, D3, D4, D5 between the core plate pieces 12, i.e., joints between the protruding portions 13 and the fitting portions 14, is the same as that of core plate pieces 12.

The core plate 11 of every layer is formed in an annular shape by coupling the plurality of (in the present embodiment, five) core plate pieces 12 having the same shape, and the core plates 11 are stacked in a bricklaying pattern so that the circumferential positions of the seams between the core plate pieces 12 are alternately displaced for every predetermined number of core plates 11 (in the present embodiment, every core plate 11) overlapping each other (adjoining each other) in the stacking direction. For example, in FIG. 1, if the stacked core plates are divided, for convenience, into odd layers and even layers as counted from the bottom of the rotor core 10, the seam positions between adjoining ones of the core plate pieces 12 in the odd layers (the odd core plates 11) are different from those between adjoining ones of the core plate pieces 12 in the even layers (the even core plates 11), as viewed in the stacking direction. The core plates 11 are stacked such that the seams (e.g., D1) between the core plate pieces 12 in the odd layers are displaced from the seams (e.g., E1) between the core plate pieces 12 in the even layers by an amount corresponding to a circumferential half of the core plate piece 12)(36°) (herein referred to as the bricklaying pattern), whereby strength is improved.

A plurality of magnet insertion holes 16 in which permanent magnets 15 (see FIG. 2) such as neodymium magnets are inserted, a plurality of clinching portions 17 that fasten the plurality of stacked core plates 11 together, and a plurality of through holes 20 which are formed on the inner peripheral side with respect to the magnet insertion holes 16 and in which pins (bar-shaped members) 19 (see FIG. 2) are inserted are formed in each core plate piece 12 in the circumferential direction thereof. The magnet insertion holes 16, the clinching portions 17, and the through holes 20 are aligned in the stacking direction when the core plates 11 are stacked. After the core plates 11 are thus temporarily placed, the clinching portions 17 are clinched, whereby the core plates 11 do not fall apart, and the rotor core 10 can maintain its shape.

A rotor of a rotating electrical machine including the rotor core 10 will be described. As shown in FIG. 2, a rotor $30_1$ has a rotor hub 31 that is fixed to a rotating shaft (not shown) and that rotates together therewith, and the rotor hub 31 includes a cylindrical portion 31a, a flange portion 31b formed at one end of the cylindrical portion 31a so as to extend in the radial direction, and a retaining portion 31c formed at the other end of the cylindrical portion 31a. The rotor core 10 is mounted on the cylindrical portion 31a such that an inner-diameter side of the rotor core 10 is fitted thereon, and the permanent magnet 15 is embedded in the magnet insertion hole 16 of the rotor core 10. The rotor core 10 is interposed between annular end plates 32, 33 such that the end plates 32, 33 close the magnet insertion hole 16 that opens in both side surfaces e, f (one side surface e and the other side surface f) of the rotor core 10 in the stacking direction. The end plates 32, 33 contact the core plates 11 located on both sides of the rotor core 10 in the stacking direction, respectively.

A retaining plate 35 is interposed between the end plate 33 located on a one side surface e side and the retaining portion 31c, and the retaining plate 35 has a substantially annular shape so as to overlap the end plate 33 in the radial direction and to contact the one side surface e of the rotor core 10. The retaining plate 35 has an annular protruding portion 35b protruding toward the one side surface e of the rotor core 10, and recessed grooves 35a are formed in the protruding portion 35b at predetermined intervals in the circumferential direction. Each recessed groove 35a extends through the protruding portion 35b in the radial direction and has a predetermined constant width. A circumferential dimension a of the width is set to be larger than a diameter dimension b of the pin 19 (a>b).

The pin 19 protrudes from both of the side surfaces e, f of the rotor core 10 and extends into the recessed groove 35a, and overlaps the end plates 32, 33 in the stacking direction. The pin 19 is placed so as not to contact the end plates 32, 33 and the recessed groove 35a, and a predetermined gap S is faulted, on a radially outside of the pin 19, between the pin 19 and the end plates 32, 33. That is, the end plates 32, 33 are formed so as to form a space portion on the radially outside of the pin 19. Referring to FIG. 6, the diameter dimension b of the pin 19 is set to be smaller than a diameter dimension h of the through hole 20 (b<h), so that the pin 19 is loose-fitted in the through hole 20. The predetermined gap S is set to be larger than a gap i of the loose-fit (i=h−b). Thus, when the rotor $30_1$ is in a non-rotating state, the pin 19 is neither fixed nor held by anything, and is loosely fitted in the through hole 20.

By clinching the retaining portion 31c toward the retaining plate 35, the rotor core 10 is held between the flange portion 31b of the rotor hub 31 and the retaining plate 35 with the end plates 32, 33 interposed therebetween, and is fixed integrally with the rotor hub 31.

Figure 3:
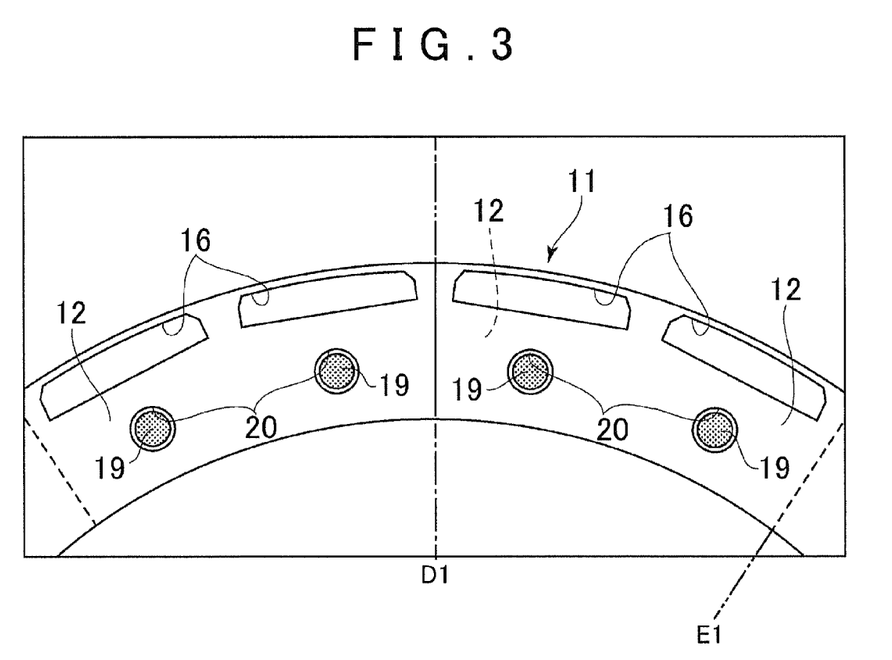
FIG. 3 is a schematic view showing a non-rotating state of the rotor core according to the first embodiment of the present invention.
Figure 4:
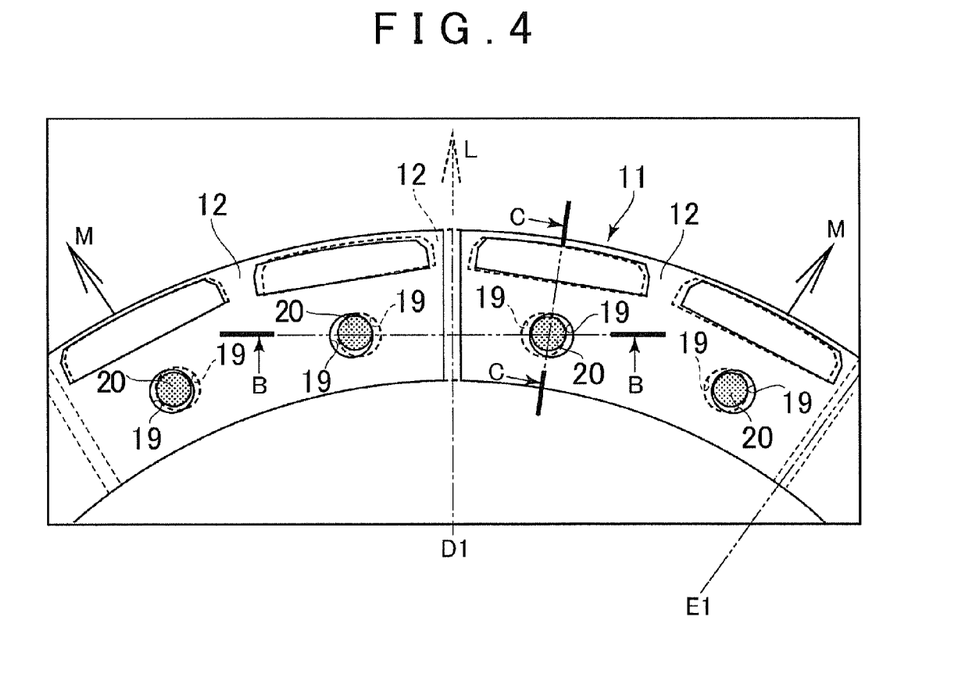
FIG. 4 is a schematic view showing a rotating state of the rotor core according to the first embodiment of the present invention.

The present embodiment is configured as described above. Thus, as shown in FIG. 3, when the rotor $30_1$ is in the non-rotating state, no core plate piece 12 is subjected to a centrifugal force, and the annular shape of the core plate 11 is maintained by coupling of the core plate pieces 12. However, as shown in FIG. 4, when the rotor $30_1$ is in a rotating state, each core plate piece 12 is subjected to a centrifugal force, and the core plate 11 is slightly extended in the direction of the centrifugal force. In this rotating state, due to the bricklaying pattern, the core plate pieces 12 adjoining each other in the stacking direction are subjected to the centrifugal force in different directions (e.g., in the case of FIG. 4, the odd layers are subjected to the centrifugal force in the direction M in the figure, and the even layers are subjected to the centrifugal force in the direction L in the figure), and the core plate pieces 12 adjoining each other in the circumferential direction try to move in the direction away from each other. Thus, the pin 19 contacts the through holes 20, which are formed in the respective core plate pieces 12, on sides different in circumferential direction for every layer, i.e. between the odd layers and the even layers.

That is, as shown in FIG. 5, when the rotor $30_1$ is rotated, the pin 19 is subjected to a shear force from the sides different in the circumferential direction for every layer, and the shear force acts uniformly in these different directions. Accordingly, the pin 19 is held only by the rotor core 10. On the other hand, as shown in FIG. 6, in the radial section of the rotor $30_1$, movement of the pin 19 in the radially outward direction, namely the direction of the centrifugal force that acts on the pin 19, is restricted by the shear force applied from the circumferentially different directions, and the pin 19 is placed so as not to contact the through hole 20 in each core piece 12 and the end plates 32, 33 in the radial direction. Since the predetermined gap S provided on the radially outside of the pin 19 between the pin 19 and the end plates 32, 33 is set to be larger than the gap i between the pin 19 and the through hole 20 (i=h−b), the pin 19 can move in the radially outward direction toward the end plates 32, 33 by an amount larger than the gap i, and no load is applied from the end plates 32, 33 to the pin 19.

The pin 19 does not contact the end plates 32, 33, the flange portion 31b of the rotor hub 31, and the retaining plate 35. However, as long as the pin 19 does not contact the end plates 32, 33, the pin 19 may contact the other members if the pin 19 is subjected to substantially no load during rotation of the rotor.

A second embodiment of the rotor of the rotating electrical machine according to the present invention will be described below with reference to FIG. 7. The portions that are the same as or similar to those of the first embodiment are denoted with the same reference characters, and description thereof will be omitted. A rotor core 10 of a rotor $30_2$ of a rotating electrical machine is interposed between end plates 32, 33 such that the end plates 32, 33 cover the entire side surfaces e, f of the rotor core 10. Each of the end plates 32, 33 includes a plurality of holes 32a, 33a corresponding to the positions of pins 19 in the stacking direction.

A diameter dimension j of the holes 32a, 33a is set to be larger than a diameter dimension b of the pin 19, and the pin 19 extends into the holes 32a, 33a without contacting the inner peripheral surfaces thereof. In particular, a predetermined gap S, which is larger than the gap i between the pin 19 and the through hole 20 (see FIG. 6), is provided on the radially outside of the pin 19 between the pin 19 and the end plates 32, 33.

A third embodiment of the rotor of the rotating electrical machine according to the present invention will be described below with reference to FIG. 8. The portions that are the same as or similar to those of the first embodiment are denoted with the same reference characters, and description thereof will be omitted. A retaining plate 35 interposed between an end plate 33 of a rotor 30$_3$ of a rotating electrical machine and a retaining portion 31c includes a first stepped portion 35c abutting on the end plate 33, and a second stepped portion 35d protruding beyond the first stepped portion 35c toward the rotor core 10 and receiving the pin 19.

The pin 19 is placed so as to protrude from both side surfaces e, f of the rotor core 10 and to overlap the end plates 32, 33 in the stacking direction, and a predetermined gap S, which is larger than the gap i between the pin 19 and the through hole 20 (see FIG. 6), is formed between the pin 19 and the end plates 32, 33 located on the radially outside of the pin 19.

Figure 9A:
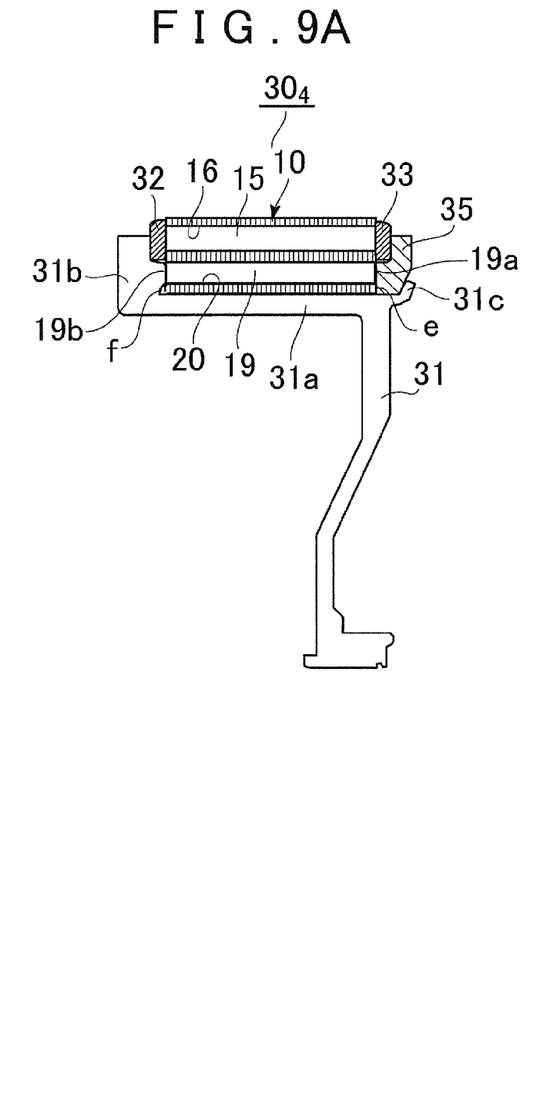
FIG. 9A is a partial view and FIG. 9B is a partial enlarged view.
Figure 9B:
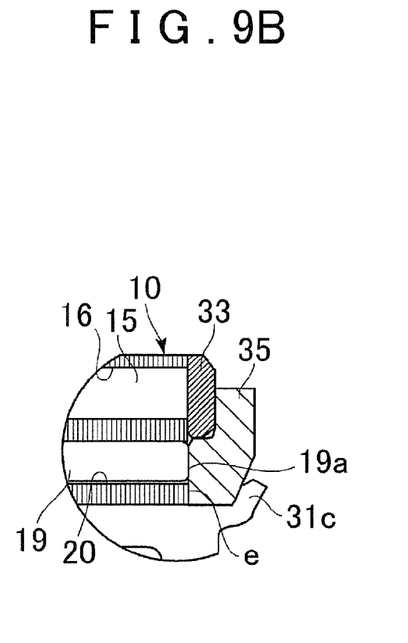

A fourth embodiment of the rotor of the rotating electrical machine according to the present invention will be described with reference to FIG. 9. The portions that are the same as or similar to those of the first embodiment are denoted with the same reference characters, and description thereof will be omitted. A pin 19 of a rotor 30$_4$ of a rotating electrical machine is formed such that both end faces 19a, 19b of the pin 19 are flush with both side surfaces e, f of the rotor core 10. A retaining plate 35 is placed so as to be interposed between an end plate 33 and a retaining portion 31c, so that the retaining plate 35 receives the end plate 33, and contacts the one side surface e of the rotor core 10 and the one end face 19a of the pin 19 with substantially no load being applied thereto.

The second to fourth embodiments are configured as described above. Accordingly, as in the first embodiment, the pin 19 is held only by the rotor core 10 during rotation of the rotor, due to the shear force from circumferentially different directions, which is applied from the core plate pieces 12 adjoining each other in the stacking direction to the pin, and no load is applied from the end plates 32, 33 to the pin 19.

The present invention is applicable to rotating electrical machines such as a brushless DC motor, and in particular, is preferable when used in rotating electrical machines for use in electric cars or hybrid cars.

What is claimed is:

1. A rotor of a rotating electrical machine, comprising: a rotor core wherein the rotor core includes an annular core plate formed by coupling a plurality of arc shaped core plate pieces,
   a plurality of the core plates is stacked together,
   a circumferential position of a seam formed by coupling the core plate pieces is alternately displaced for every predetermined number of core plates in a stacking direction of the core plates,
   a bar-shaped member is inserted in a plurality of through holes formed in the respective core plate pieces and aligned in the stacking direction, and
   both side surfaces of the rotor core in the stacking direction are interposed between end plates, the end plates contact the core plates, and
   the end plates do not contact the bar-shaped member at least on a radially outside of the bar-shaped member, which is a side in a direction of a centrifugal force that acts on the bar-shaped member.

2. The rotor of the rotating electrical machine according to claim 1, wherein
   the bar-shaped member contacts the through holes in the respective core plate pieces during rotation of the rotor such that movement of the bar-shaped member toward the radially outside of the bar-shaped member is restricted.

3. The rotor of the rotating electrical machine according to claim 2, wherein
   the end plates are formed such that a space portion is formed on the radially outside of the bar-shaped member.

4. The rotor of the rotating electrical machine according to claim 3, wherein
   a diameter dimension of the bar-shaped member is smaller than a diameter dimension of the through holes, and the bar-shaped member is loose-fitted in the through holes.

5. The rotor of the rotating electrical machine according to claim 4, wherein
   a predetermined gap, which is larger than a gap of the loose-fit, is formed on the radially outside of the bar-shaped member between the bar-shaped member and the end plates.

6. The rotor of the rotating electrical machine according to claim 5, wherein
   the rotor core is mounted on a rotor hub that is fixed to a rotating shaft and that rotates together therewith, and
   the rotor core and the end plate are fixed by a retaining portion provided in the rotor hub, with a retaining plate interposed therebetween.

7. The rotor of the rotating electrical machine according to claim 6, wherein
   the retaining plate has a recessed groove on one side in the stacking direction such that a circumferential dimension of the recessed groove is larger than a diameter dimension of the bar-shaped member, and
   the bar-shaped member overlaps the end plates in the stacking direction and extends into the recessed groove, and is placed such that a predetermined gap is formed at least on the radially outside of the bar-shaped member between the bar-shaped member and the end plates and the recessed groove.

8. The rotor of the rotating electrical machine according to claim 2, wherein
   a diameter dimension of the bar-shaped member is smaller than a diameter dimension of the through holes, and the bar-shaped member is loose-fitted in the through holes.

9. The rotor of the rotating electrical machine according to claim 8, wherein
   a predetermined gap, which is larger than a gap of the loose-fit, is formed on the radially outside of the bar-shaped member between the bar-shaped member and the end plates.

10. The rotor of the rotating electrical machine according to claim 1, wherein
    the end plates are formed such that a space portion is formed on the radially outside of the bar-shaped member.

11. The rotor of the rotating electrical machine according to claim 10, wherein
    a diameter dimension of the bar-shaped member is smaller than a diameter dimension of the through holes, and the bar-shaped member is loose-fitted in the through holes.

12. The rotor of the rotating electrical machine according to claim 11, wherein
    a predetermined gap, which is larger than a gap of the loose-fit, is formed on the radially outside of the bar-shaped member between the bar-shaped member and the end plates.

13. The rotor of the rotating electrical machine according to claim 1, wherein
a diameter dimension of the bar-shaped member is smaller than a diameter dimension of the through holes, and the bar-shaped member is loose-fitted in the through holes.

14. The rotor of the rotating electrical machine according to claim 13, wherein
a predetermined gap, which is larger than a gap of the loose-fit, is formed on the radially outside of the bar-shaped member between the bar-shaped member and the end plates.

15. The rotor of the rotating electrical machine according to claim 1, wherein
the rotor core is mounted on a rotor hub that is fixed to a rotating shaft and that rotates together therewith, and
the rotor core and the end plate are fixed by a retaining portion provided in the rotor hub, with a retaining plate interposed therebetween.

16. The rotor of the rotating electrical machine according to claim 15, wherein
the retaining plate has a recessed groove on one side in the stacking direction such that a circumferential dimension of the recessed groove is larger than a diameter dimension of the bar-shaped member, and
the bar-shaped member overlaps the end plates in the stacking direction and extends into the recessed groove, and is placed such that a predetermined gap is formed at least on the radially outside of the bar-shaped member between the bar-shaped member and the end plates and the recessed groove.

17. The rotor of the rotating electrical machine according to claim 15, wherein
a hole having a larger diameter dimension than the bar-shaped member is provided in the end plates, and
the bar-shaped member extends into the hole such that a predetermined gap is formed at least on the radially outside of the bar-shaped member between the hole and the bar-shaped member.

18. The rotor of the rotating electrical machine according to claim 15, wherein
the retaining plate has a first stepped portion abutting on the end plate, and a second stepped portion protruding beyond the first stepped portion toward the rotor core and receiving the bar-shaped member, and
the bar-shaped member is placed such that a predetermined gap is formed at least on the radially outside of the bar-shaped member between the bar-shaped member and the second stepped portion and the end plates, and that the bar-shaped member overlaps the end plates in the stacking direction.

* * * * *